United States Patent
Beketayev et al.

(10) Patent No.: US 9,818,307 B2
(45) Date of Patent: Nov. 14, 2017

(54) COMMUNICATION DEVICE INTERFACE FOR A SEMANTIC-BASED CREATIVITY ASSESSMENT

(71) Applicant: SparkTing LLC., Berkeley, CA (US)

(72) Inventors: Kenes Beketayev, Berkeley, CA (US); Farzad Eskafi, Berkeley, CA (US); Serik Beketayev, Berkeley, CA (US); Zhomart Mukhamejanov, Berkeley, CA (US)

(73) Assignee: SPARKTING LLC, Berkeley, CA (US)

( * ) Notice: Subject to any disclaimer, the term of this patent is extended or adjusted under 35 U.S.C. 154(b) by 334 days.

(21) Appl. No.: 14/572,617

(22) Filed: Dec. 16, 2014

(65) Prior Publication Data

US 2016/0171901 A1 Jun. 16, 2016

Related U.S. Application Data

(60) Provisional application No. 62/029,568, filed on Jul. 28, 2014.

(51) Int. Cl.
*G09B 7/00* (2006.01)
*G09B 7/02* (2006.01)

(52) U.S. Cl.
CPC .................... *G09B 7/02* (2013.01)

(58) Field of Classification Search
USPC ....................................... 434/362
See application file for complete search history.

(56) References Cited

U.S. PATENT DOCUMENTS 6,167,370 A * 12/2000 Tsourikov ............. G06F 17/272
704/9
8,465,355 B1 * 6/2013 Liang ..................... A63F 13/46
463/10
2013/0045472 A1 * 2/2013 Post ....................... G09B 19/00
434/362

* cited by examiner

*Primary Examiner* — Kesha Frisby
(74) *Attorney, Agent, or Firm* — Haynes and Boone, LLP

(57) ABSTRACT

There are provided systems and methods for a communication device interface for a semantic-based creativity assessment. A user may utilize a communication device to view an interface having a creativity assessment and respond to the creativity assessment. The creativity assessment may include test items generated from task types and terms in a database. The test items may also be generated based on the user, such as using the user's past responses to other creativity assessment tests. Once the user responds to the creativity assessment, the text and/or units of text are parsed into individual sections and the resulting parsed text is scored based on the semantic characteristics determined from the parsed text. The semantic characteristics of the parsed text may be scored based on the response's fluency, flexibility, originality, and elaboration. The score may be provided to the user so the user may view their creativity measures over time.

20 Claims, 6 Drawing Sheets

COMMUNICATION DEVICE INTERFACE FOR A SEMANTIC-BASED CREATIVITY ASSESSMENT

CROSS REFERENCE TO RELATED APPLICATIONS

This application claims priority to and the benefit of Provisional Application Ser. No. 62/029,568, filed Sep. 23, 2014.

TECHNICAL FIELD

The present application generally relates to a communication device interface for a semantic-based creativity assessment and more specifically to automated generation of testing items for use in a creativity assessment that utilizes semantic analysis of user responses to determine a creativity score for a user.

BACKGROUND

Human creativity is a skill innate to people that may be harnessed to perform tasks, such as imagining ideas, creating literary and artistic works, solving problems, completing tasks, and inventing new items. Therefore, assessment of human creativity is important to a wide variety of entities, including employers, who may be concerned with the abilities and performance of employees. Further development of human creativity is largely important to the well-being and enhancement of each person, as well as collective groups of people.

In order to assess and develop human creativity, traditional methods view the processes and abilities associated with the creative process in order to understand and enhance a person's creativity. Research focusing on assessment and development of human creativity includes psychoanalytical, cognitive, social-personality, psychometric, and pragmatic approaches. When utilizing psychometric and pragmatic approaches to measure human creativity, various characteristics may be analyzed and scored. Further, such responses may be concerned with both verbal and non-verbal responses to tests that analyze these characteristics. However, traditional testing is done through pen/pencil formats and is discretionary with respect to analysis of user response to test items. Thus, the tests are difficult to administer at a larger scale and the evaluation of such test responses remain subjective to the scorer.

Figure 1:
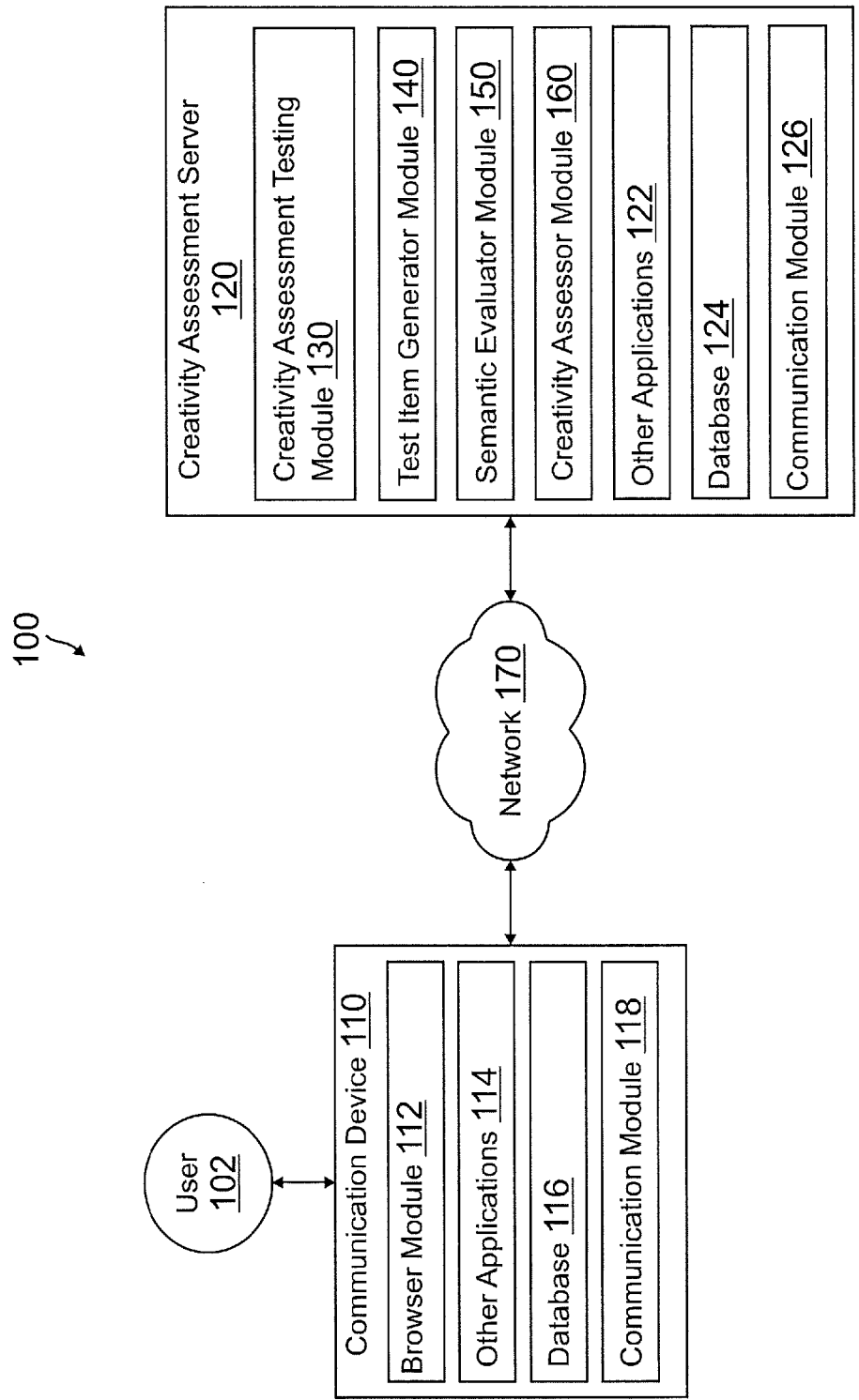
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a communication device interface for a semantic-based creativity assessment. Systems suitable for practicing methods of the present disclosure are also provided.

A user may wish to perform a creativity assessment in order to determine scores for measures associated with the user's human creativity. In doing so, a user may utilize a communication device to access a website that offers a creativity assessment. A browser application of the communication device may access the website in order to receive a user interface having at least one test item that tests human creativity. A server for the website may determine test item(s) to include in the user interface by executing a test item generator module including specialized hardware (for example, at least one hardware processor utilized for generating test items) and/or software that accesses one or more task types stored to a database in a non-transitory memory of the server. A task type may include a specific task for the user to complete, such as a word arrangement, a word association, word mapping, picture/word identification, and/or other types of tasks that may be utilized to determine the user's creativity level. For example, further tasks associated with a level of human creativity may be games that test creative association, context, selection, or other exercise in creativity. The task type may do so through the use of one or more terms in the database. The terms may include text/words or groups of text/words. In other embodiments, the task types may also be tested with other testing materials, such as pictures, videos, or other visible objects. The terms (e.g., the text/words and/or groups of text/words) may be associated with semantic characteristics. For example, each word in the database may include one or more semantic characteristic that defines the word. A semantic characteristic may correspond to a grouping the term belongs to, a definition of the term, a rarity of the term, or other characteristic related to the meaning of the word in language or logical usage. For example, a semantic characteristic may also correspond to a semantic relation of a term to other terms. In such embodiments, the semantic characteristic may be associated with how closely and/or distantly related terms are based on their semantic meaning, whether word belong to a same or similar family of words through their semantic meaning, or other semantic relationship between two or more words. Semantic characteristics may be pre-computed, such as through other user to one or more creativity assessment tests described here, through analysis of a corpus of text documents and extraction of corresponding semantic characteristics, and/or through an administrators input and analysis.

Once a test item is generated by the test item generator module, the test item may be presented to the user through the interface communicated to the user's communication device. The user may utilize the communication device to respond to the test item by answering the task type of the test item based on the term(s) included with the test item. For example, a task type may ask a user to respond with as many words as the user can think of that are associated with a term included with the task type. The term may be something such as "bird," "daisy," "car," or other item. Thus, the user may respond with answers such as "possession," "item," etc. The task item may also ask the user to map between multiple terms, such as a ranking of 5 terms. The user may utilize the communication device to enter responses to the test item(s), which may be transferred to the server of the website for analysis.

The server of the website may execute a semantic evaluator module including specialized hardware (for example, at least one hardware processor utilized for semantic evaluation) and/or software that may analyze the user's input to the user interface in response to the test item(s). The user input may include the user's responses to the test item(s) and may be parsed to separate text/words and units of text/words that the user has entered in response to the test item(s). The parsed results may be determined by the semantic evaluator using the database for the server, such as through identification using the terms within the database. Once the parsed results are determined, the parsed results may be analyzed by a creativity assessor module including specialized hardware (for example, at least one hardware processor utilized for creative assessment) and/or software.

The creativity assessor module may determine a score used to assess a user's creativity. Scores may be normalized so as to provide a comparison between a plurality of users that take the same and/or similar creativity assessment. The scores may be based on the semantic characteristic(s) of the word(s) in the test item as well as the word in the user's input. Thus, a score for a user's creativity may compare a user's creativity to a standard level so that the user may know their ranking, percentage, and/or other comparison to a generalized public. The creativity assessor module may determine the score for the user by determining a number of unique responses to the test item(s), a number of distinct categories in the responses to the test item(s), a measure of statistical infrequency of responses to the test item(s), and/or a level of depth of the responses to the test item(s). The score may also contain one or more measures of creativity, such as a fluency measure, a flexibility measure, an originality measure, and/or an elaboration measure. For example, the fluency measure may be associated with the user's ability to generate as many distinguishable ideas as possible and may be measured by quantifying the number of ideas presented in the user input. The flexibility measure may be associated with divergency, for example, how categorically diverse the ideas are in the user input such as through how closely related the ideas in the user input is. The originality measure may be associated with the user's ability to generate ideas with varying degrees of uniqueness and may be measured through the infrequency of the use of an idea in the task type. The originality measure may correspond to the infrequency of the user's response(s) to a particular test item. For example, the originality measure may correspond to the literal infrequency of the user response and/or may be approximated using semantic characteristics of the test item and user response, such as a semantic associativity distance. Moreover, the elaboration measure may be associated with the user's ability to elaborate ideas and may be measured by the user's depth of response.

Once the score and/or the score for each measure are determined, the user may be updated on the score, such as through a user interface of the website presented on the browser application of the user. The user interface of the website may display a profile for the user that may include the score for the user and scores for each measure. Moreover, the user interface may present past scores of the user and may keep an ongoing score for the user, such as how the user's score changes over time. The user's score may also be averaged or otherwise calculated over time to show the user's current score factoring in the users over time performance on creativity-assessments.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102 with a communication device 110 in communication with a creativity assessment server 120 over a network 170. User 102 may utilize communication device 110 to access creativity assessment server 120 over network 170 in order to view a user interface having one or more test items for the user to answer. User 102 may provide a user response to the test item(s), which may be communicated to creativity assessment server 120. The user response may then be parsed and scored by creativity assessment server 120, which may provide the result to user 102 on communication device 110. The user may also view past scores and over time scores from creativity assessment server 120.

Communication device 110 and creativity assessment server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with creativity assessment server 120. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

Communication device 110 of FIG. 1 contains a browser module 112, other applications 114, a database 116, and a communication module 118. Browser module 112 and other applications 114 may correspond to executable processes, procedures, and/or applications with associated hardware. In other embodiments, communication device 110 may include additional or different hardware and software as required.

Browser module 112 may be used, for example, to provide a convenient interface to permit user 102 to browse the Internet, including navigation to websites and between webpages of websites. Browser module 112 may therefore be configured to transmit and receive information, such as webpage requests, input to webpages, downloads and uploads of data, such as data in database 116 of communication device 110, etc. In various embodiments, browser module 112 may be used to access a website corresponding to creativity assessment server 120 and view a user interface available from creativity assessment server 120 that may include one or more test items determined by creativity assessment server 120, as will be explained in more detail herein. In other embodiments, browser module 112 may correspond to a dedicated application for creativity assessment server 120, such as an application/module specific to creativity assessment server 120, where user 102 may view one or more interfaces allowing user 102 to view the test items. Using browser module 112, user 102 may enter user input in response to the test item, which may be communicated to creativity assessment server 120. Creativity assessment server 120 may also provide user 102 with an interface through browser module 112 that enables user 102 to view a score for the user input, past scores for other test items that user 102 has previously completed, and/or historical statistic on user 102's response to test items.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with a payment provider, for example, to provide payment to creativity assessment server 120 for use of creativity assessment services. Other applications 114 may include device interfaces and other display modules that may receive input from user 102 and/or output information to user 102. For example, other applications 114 may contain software programs executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with browser module 112 and/or other applications 114, identifiers associated with hardware of communication device 110, or other appropriate identifiers, such as identifiers used for payment/user/device authentication or identification. Thus, database 116 may store account and/or usage information associated with creativity assessment server 120 that may be utilized with future use of creativity assessment server 120. Furthermore, database 116 may further include received information from creativity assessment server 120, for example, user interfaces, test items, and/or scoring information for user 102.

Communication device 110 includes at least one communication module 118 adapted to communicate with creativity assessment server 120. In various embodiments, communication module 118 may correspond to a network interface component and include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Creativity assessment server 120 may be maintained, for example, by a service provider, which may provide human creativity analysis using one or more test items determined by creativity assessment server 120 and administered through a user interface provided by creativity assessment server 120. In this regard, creativity assessment server 120 includes one or more processing applications which may be configured to interact with communication device 110 to provide such creativity analysis through at least one module having specialized hardware and/or software. Although only one server is shown, a plurality of servers and/or devices may function similarly. Although creativity assessment server 120 is described as a server device, in various embodiments, creativity assessment server 120 may function as a specialized device that may function similarly to the described server embodiments. Thus, in certain embodiments, creativity assessment server 120 may communicate through wired or short range wireless communication with communication device 110.

Creativity assessment server 120 of FIG. 1 includes a creativity testing module 130, a test item generator module 140, a semantic evaluator module 150, a creativity assessor module 160, other applications 122, a database 124, and a communication module 126. Creativity assessment testing module 130, test item generator module 140, semantic evaluator module 150, creativity assessment module 160 and other applications 122 may correspond to executable processes, procedures, and/or applications with associated hardware. In other embodiments, creativity assessment server 120 may include additional or different hardware and software as required.

Creativity assessment testing module 130 may correspond to one or more processes to execute modules and associated devices of creativity assessment server 120 so as to administer test items for a creativity assessment for user 102 and receive user 102's input in response to the test items. In this regard, creativity assessment testing module 130 may correspond to specialized hardware and/or software utilized by creativity assessment server 120 with communication device 110 in order to communicate test items determined by test item generator module 140 to user 102 in an interface. Creativity assessment testing module 130 may provide an interface to browser module 112 when user 102 accesses creativity assessment server 120 using communication device 110. The interface may allow user 102 to log in to an account and/or provide user specific services. Creativity assessment testing module 130 may provide user information in the interface, such as user account information (e.g., account name, history, and/or payment information) as well as past performance of user 102 with respect to creativity assessment. Thus, the user interface may provide one or more profile tabs/options and/or creativity history tabs/ option to user 102. However, in other embodiments, creativity assessment testing module 130 may provide a generalized interface to user 102 for use in performing a creativity assessment.

Once test item generator module 140 has generated at least one test item, as will be discussed in more detail herein, creativity assessment testing module 130 may communicate the test item(s) to user 102 as a creativity test/assessment in the interface. Creativity assessment testing module 130 may receive user input in response to the test item(s) from communication device 110. Semantic evaluator module 150 and/or creativity assessor module 160 may analyze the user response to determine user 102's creativity assessment, as will be discussed in more detail herein. Once the user input is analyzed and a score or other resulting measurement is determined, the score/measurement may be presented to user 102 through the interface provided by creativity assessment testing module 130.

Test item generator module 140 may correspond to one or more processes to execute modules and associated devices of creativity assessment server 120 to determine test items to present to user 102 for testing user 102's creativity. In this regard, test item generator module 140 may correspond to specialized hardware and/or software utilized by creativity assessment server 120 to access one or more task types and terms or units of terms stored to database 124 in a non-transitory memory of creativity assessment server 120. As previously discussed, a task type may include a specific task for the user to complete. For example, various types of task types may include games or exercises associated with terms, such as a similar word request, a word arrangement, a word association, word mapping, picture/word identification, and/or other types of exercises term, picture, or other visual-unit. Task types may be associated with a level of human creativity that explore or require use of text/word or unit of text/word association, context, selection, or other exercise in creativity.

Test item generator module 140 may test the task type using one or more terms or unit of terms stored in database 124 and possessing associated semantic characteristics. Terms and/or unit of terms may correspond to one or more words, pictures, or other visual keys that may be viewable by user 102. Thus, terms may include not just words that may be tested through word association and/or matching, but also image association and/or matching. The terms may be associated with semantic characteristics. For example, each word term may have a number of related words, how common each related word is, a category for each related word, and a level of depth to the number of words that describe or are related to the word. Other semantic characteristics may correspond to a grouping the term belongs to, a definition of the term, a rarity of the term, or other characteristic related to the meaning of the word in language or logical usage. Similarly, images or other testing material may also have similar characteristic that may be broken down to their meaning.

Test item generator module 140 may generate a test item by having a task type be tested with one or more terms selected from database 124. Thus, test item generator module 140 may ask for a game or exercise to be executed with at least one term having semantic characteristics. The test item may, therefore, ask for matching terms to a selected term, word mapping between two or more selected terms, word comparison between two or more selected teens, and/or other type of creativity assessment testing. Once the test item is generated, the test item may be administered to user 102 through the user interface, as previously discussed.

Once user 102 has responded to the test item(s) by providing user input, creativity assessment server 120 may execute semantic evaluator module 150 including one or more processes to execute modules and associated devices of creativity assessment server 120 to determine semantic characteristic of the user input. In this regard, semantic evaluator module 150 may correspond to specialized hardware and/or software utilized by creativity assessment server 120 to access the user input and determine the semantic characteristics of the user input. Semantic evaluator module 150 may determine the semantic characteristics by breaking down the terms and/or units of terms in the user input in response to the test item according to a number of responses in the user input, a number of distinct categories in the user input, and/or statistical information about the term/unit of terms responses in the user input. For example, each unique response may constitute a number in the number of responses. However, distinct categories in the user input may be measured by the category each term/unit of term falls into for a response. Thus, "car" and "truck" may both fall into a "land based vehicle" category, while "car" and "plane" may be two separate categories. Further, "car" and "plane" may fall into a "vehicle" category, while "car" and "television" fall into two further separate categories. The answer terms/units of terms may also include statistical analysis of the terms/units of terms, such as a rarity of the terms/unit of terms in response to the chosen term from database 124, a level of depth to the chosen term, or other statistical analysis. Thus, semantic evaluator module 150 may parse the user input to determine the semantic characteristics of the user input, for example, using information available in database 124.

Creativity assessor module 160 may include one or more processes to execute modules and associated devices of creativity assessment server 120 to analyze semantic characteristics determined by semantic evaluator module 150 and determine a general score for user 102 and/or particular score for one or more creative measures. In this regard, creativity assessor module 160 may correspond to specialized hardware and/or software utilized by creativity assessment server 120 to access the semantic characteristics and determine user 102's scores. Creativity assessor module 160 may assess user 102's creativity by performing algorithmic analysis of the semantic characteristics to determine the scores. For example, semantic characteristics may be associated with a number of unique responses, categories of unique responses, rarity of each response, and/or depth of the responses.

Thus, creativity assessor module 160 may determine the score for the user by determining a number of unique responses to the test item(s), a number of distinct categories in the responses to the test item(s), a measure of statistical infrequency of responses to the test item(s), and/or a level of depth of the responses to the test item(s). Thus, creativity assessor module 160 may process the semantic characteristics to determine the aforementioned items. Each of the aforementioned items may correspond to one or more measures of creativity, such as a fluency measure, a flexibility measure, an originality measure, and/or an elaboration measure. For example, the fluency measure may be associated with the user's ability to generate as many distinguishable ideas as possible and may be measured by quantifying the number of ideas presented in the user input. The flexibility measure may be associated with divergency, for example, how categorically diverse the ideas are in the user input, such as through how closely related the ideas in the user input are. The originality measure may be associated with the user's ability to generate ideas with varying degrees of uniqueness and may be measure through the infrequency of the use of an idea in the task type. Moreover, the elaboration measure may be associated with the user's ability to elaborate ideas and may be measured by the user's depth of response. Thus, using the information available about the semantic characteristics in the user input, each measure of creativity may be scored.

Scores may be normalized so as to provide a comparison between a plurality of users that take the same and/or similar creativity assessment. Thus, a score for a user's creativity may compare a user's creativity to a standard level so that the user may know their ranking, percentage, or other comparison to a generalized public. Further, creativity assessor module 160 may adjust user 102's score over time. User 102 may view how their creativity assessment and measures have performed over time and also how they have improved or declined. Furthermore, user 102 may utilize another exercise feature of test item generator module 140 to take test items that are not scored by creativity assessor module 160 or do not affect user 102's stored score and/or score over time. In such embodiments, scores determined by creativity assessor module 160 may also be utilized to assist test item generator module 140 in creating new test items.

In various embodiments, creativity assessment server 120 includes other applications 122 as may be desired in particular embodiments to provide features to creativity assessment server 120. For example, other applications 122 may include security applications for implementing server-side security features, programmatic server applications for interfacing with appropriate application programming interfaces (APIs) over network 170, or other types of applications. Other applications 122 may contain software programs, executable by a processor, including a graphical user interface (GUI), configured to provide an interface to a user, for example, to provide user 102 with account creation, payment, and/or other services.

Additionally, creativity assessment server 120 includes database 124. In various embodiments, creativity assessment server 120 allow user 102 to establish user accounts with creativity assessment server 120 that may include user information. For example, user account or user information in database 124 may include user login, personal, financial, and creativity assessment information. The user account and/or user information may be utilized by user 102 to view historic creativity assessment information for user 102. In other embodiments, creativity assessment server 120 may not provide a user account, and a creativity assessment for user 102 may be newly performed each time user 102 accesses creativity assessment server 120 using communication device 110. Database 124 may further include information used to present a user interface, information used to determine test items (e.g., task types and terms), and user information to score user input in response to one or more test items. Thus, database 124 may include algorithmic analysis information, statistical information and history, and/or creativity measure information that may be utilized by one or more of semantic evaluator module 150 and/or creativity assessor module 160 for use in parsing and scoring user input.

In various embodiments, creativity assessment server 120 includes at least one communication module 126 adapted to communicate with communication device 110 over network 170. Communication module 126 may correspond to a network interface component and include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
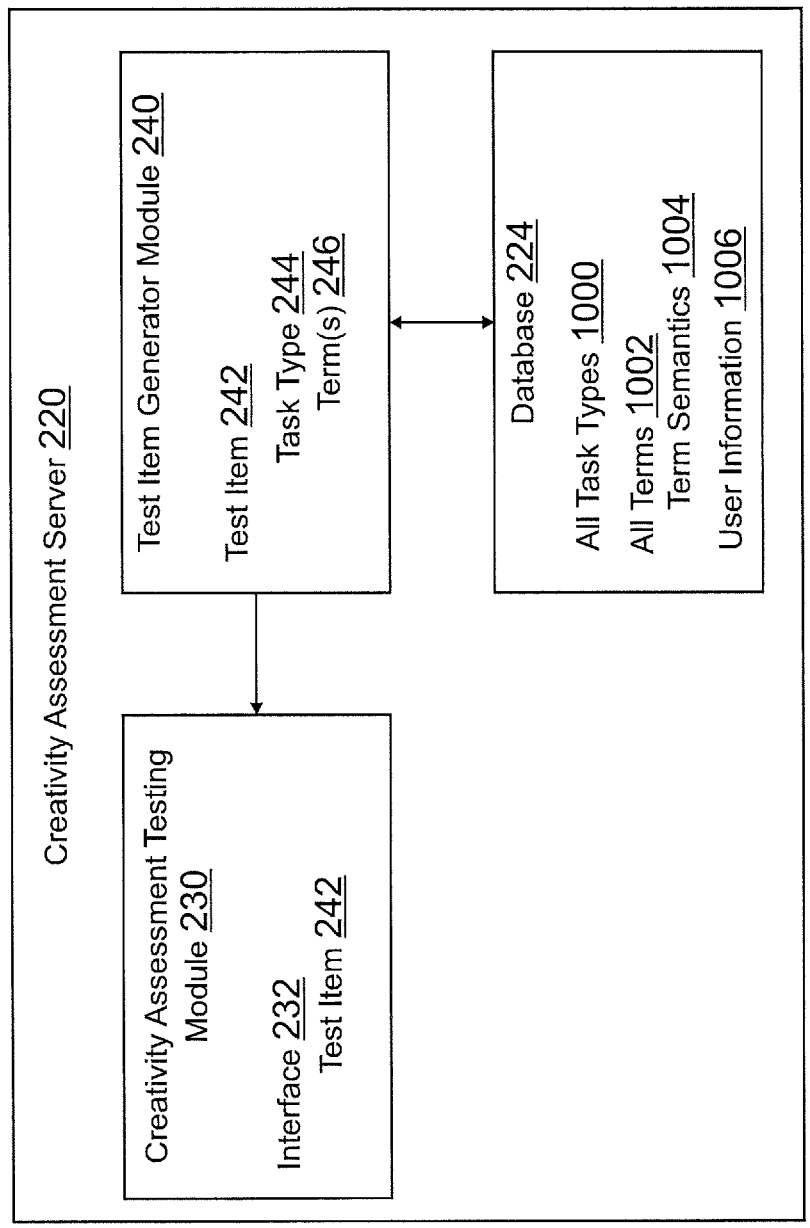
FIG. 2A includes exemplary server modules for providing an interface having a test item using one or more terms, according to an embodiment.

FIG. 2A includes exemplary server modules for providing an interface having a test item using one or more terms, according to an embodiment. FIG. 2A includes a creativity assessment server 220 corresponding generally to creativity assessment server 120 of FIG. 1. Additionally, creativity assessment server 220 executes creativity assessment testing module 230 and test item generator module 240 corresponding generally to the specialized hardware and/or software modules and processes described in reference to creativity assessment testing module 130 and test item generator module 140, respectively, of FIG. 1.

Creativity assessment server 220 executes creativity assessment testing module 230 in order to provide a user interface to a communication device of a user that displays one or more test items to the user and receives input from the user in response to the test item(s). In this regard, creativity assessment testing module 230 includes an interface 232 having a test item 242. As previously discussed, interface 232 may correspond to a user interface displayable on a communication device, and may present a variety of information to a user, such as an interface layout, options, information, and test item 242. Test item 242 may correspond to a task, test, game, or other interactive interface element displayed to the user and used to test a user's creativity. In this regard, test item 242 may be determined by test item generator module 240 using database 224.

As shown in FIG. 2A, test item generator module 240 includes test item 242 having a task type 244 and term(s) 246. Test item generator module 240 may access database 224 having all task types 1000, all terms 1002 with term semantics 1004, and user information 1006. All task types 1000 may include all types of tasks, games, events, interactive elements, or other type of generalized test that a user may perform to test creativity. All task types 1000 may be supplemented with all terms 1002 that have term semantics 1004. Terms in all terms 1002 may include one or more words/text and/or units of words/text. Each term in all terms 1002 may include associated semantic in term semantics 1004. Utilizing one or more task types in all task types 1000, such as task type 244, test item generator module 240 may select one or more terms in all terms 1002 based on the term(s)' semantics in term semantics 1004, such as complexity of the term. A complexity of the term may include factors such as statistic frequency of the term in one or more responses to task items, a response rate of or items, text, or words, for the term, a number of responses of items, text, or words to the term, or other factor. Selection of both the task type and term(s) by test item generator module 240 may further depend on user information 1006. For example, user information 1006 may include past user input in response to one or more past test items, what test items and terms a user has previously been tested on, or other user information (e.g., a creativity score for the user).

Once test item generator module 240 accesses all task types 1000, all terms 1002, and/or user information 1006, test item generator module 240 may determine test item 242 having task type 244 and term(s) 246. Test item 242 may then be communicated to creativity assessment testing module 230 for inclusion in interface 232. A user may respond to test item 242 in interface 232. Thus, in FIG. 2B, the user input in response to test item 242 may be parsed and processed to determine a score for the user's creativity assessment.

Figure 2B:
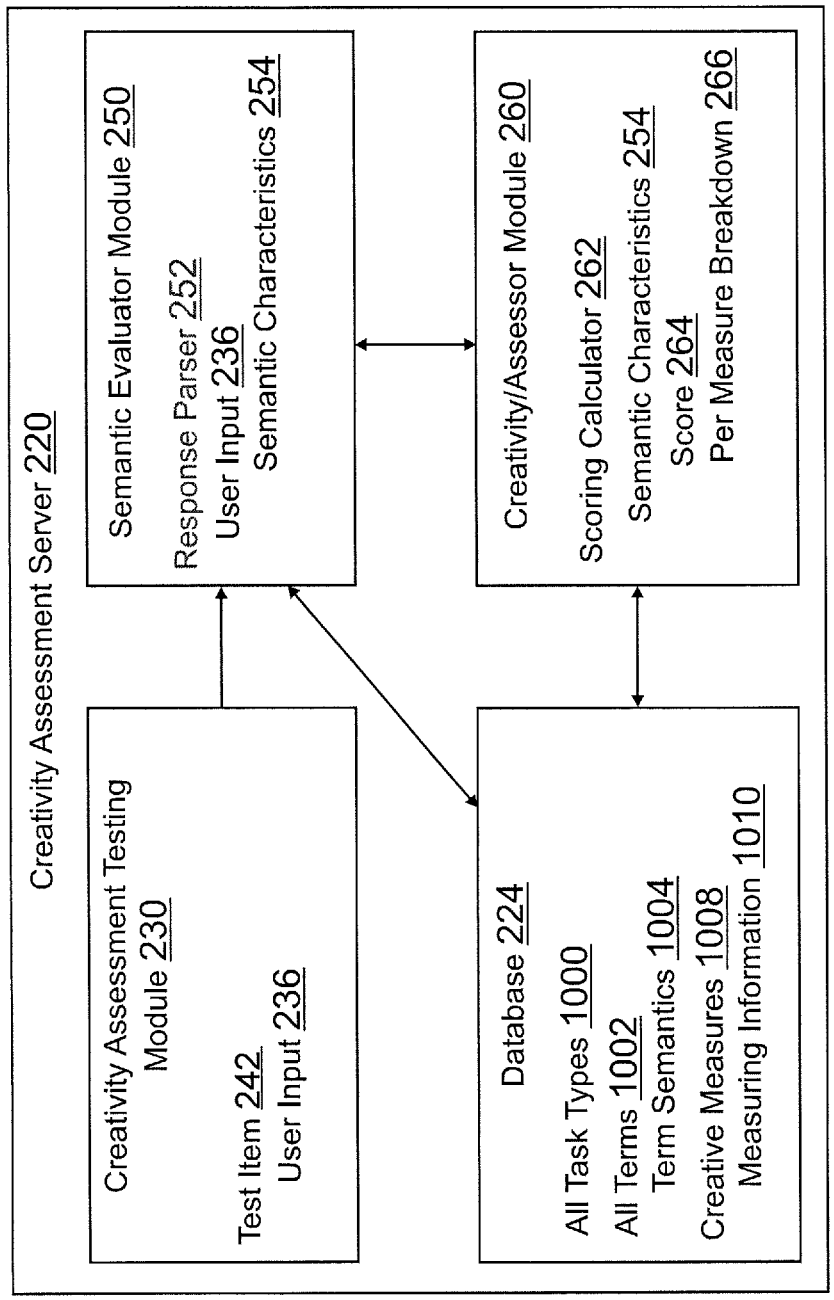
FIG. 2B shows exemplary server modules analyzing a user response to a provided test item in order to determine scores for one or more semantic measurements, according to an embodiment.

FIG. 2B shows exemplary server modules analyzing a user response to a provided test item in order to determine scores for one or more semantic measurements, according to an embodiment. FIG. 2B includes a creativity assessment server 220 corresponding generally to creativity assessment server 120 of FIG. 1. Additionally, creativity assessment server 220 executes creativity assessment testing module 230, a semantic evaluator module 250, and a creativity assessor module 260 corresponding generally to the specialized hardware and/or software modules and processes described in reference to creativity assessment testing module 130, a semantic evaluator module 150, and a creativity assessor module 160, respectively, of FIG. 1.

Creativity assessment server 220 executes creativity assessment testing module 230 to receive user input to a test item. Thus, creativity assessment testing module 230 includes a test item 242 corresponding to test item 242 of FIG. 2A and having user input 236 in response to test item 242. Creativity assessment module 230 may communicate user input 236 to semantic evaluator module 250 for processing. Utilizing a response parser 252, semantic evaluator module 250 may parse user input 236 into words/text and/or units of words/text. For example, user input may include multiple one word or short sentence answers that may be parsed into their respective words and/or units of words. Once semantic evaluator module 250 has been parsed into text answers, semantic evaluator module 250 may further determine the semantic characteristics of the text answers, for example, using database 224. The text answers may be compared to all terms 1002 and/or term semantics 1004, or further definitions and semantic characteristics stored to database 224 may be utilized to determine the semantic characteristics of the text answers. The text answers may also be dependent on all task types 1000, such as a frequency of response of a text answer to one or more task types in all task types 1000. The semantic characteristics of the test answers may include semantic similarity distances for words/text and/or units of words/text in the text answers. Semantic characteristics may also include information about the text answers, such as the number of unique responses in the text answers, the number of categories the unique responses fall into in the text answers, the statistical frequency/infrequency of each of the text answers, and a level of depth or elaboration of each and the entire amount of text answers. Semantic evaluator module 250 may utilize algorithmic analysis of the text answers to determine semantic characteristics 254.

Semantic evaluator module 250 may communicate semantic characteristics 254 to creativity assessor module 260 in order to score a creativity assessment for user input 236 received from the user. Creativity assessor module 260 may execute a scoring calculator 262, which may perform further algorithmic analysis of semantic characteristic 254 for user input 236, such as the semantic characteristics of each text answer in the text answers and the text answers as a whole. Thus, scoring calculator 262 may utilize creative measure 1008 having measuring information 1010 from database 224. Creative measures 1008 may correspond to an overall creative measure or assessment for a user's creativity in general. Further creative measures 1008 may include a breakdown of particular types of creative measures, including a fluency, a flexibility, an originality, and an elaboration measure. As previously discussed, the fluency measure may be associated with the user's ability to generate as many distinguishable ideas as possible and may be measured by quantifying the number of ideas presented in the user input. The flexibility measure may be associated with divergency, for example, how categorically diverse the ideas are in the user input, such as through how closely related the ideas in the user input are. The originality measure may be associated with the user's ability to generate ideas with varying degrees of uniqueness and may be measure through the infrequency of the use of an idea in the task type. Moreover, the elaboration measure may be associated with the user's ability to elaborate ideas and may be measured by the user's depth of response. Thus, measuring information 1010 may include algorithmic analysis of each of the aforementioned measures.

Thus, scoring calculator 262 may determine score 264 having a general score and/or per measure breakdown 266. Per measure breakdown 266 may correspond to the fluency, flexibility, originality, and elaboration measure. The fluency measure may be determined using a number of unique and relevant responses in user input 236; the flexibility measure may be determined using a number of distinct categories of responses in user input 236; the originality measure may be determined using a measure of a statistical infrequency of each response in user input 236; the elaboration measure may be determined using a level of detail for responses in user input 236. Once score 264 and per measure breakdown 266 are determined, score 264 and per measure breakdown 266 may be stored to database 224 and/or presented to a user on a communication device using creativity assessment testing module 230, as shown in FIG. 3.

Figure 3:
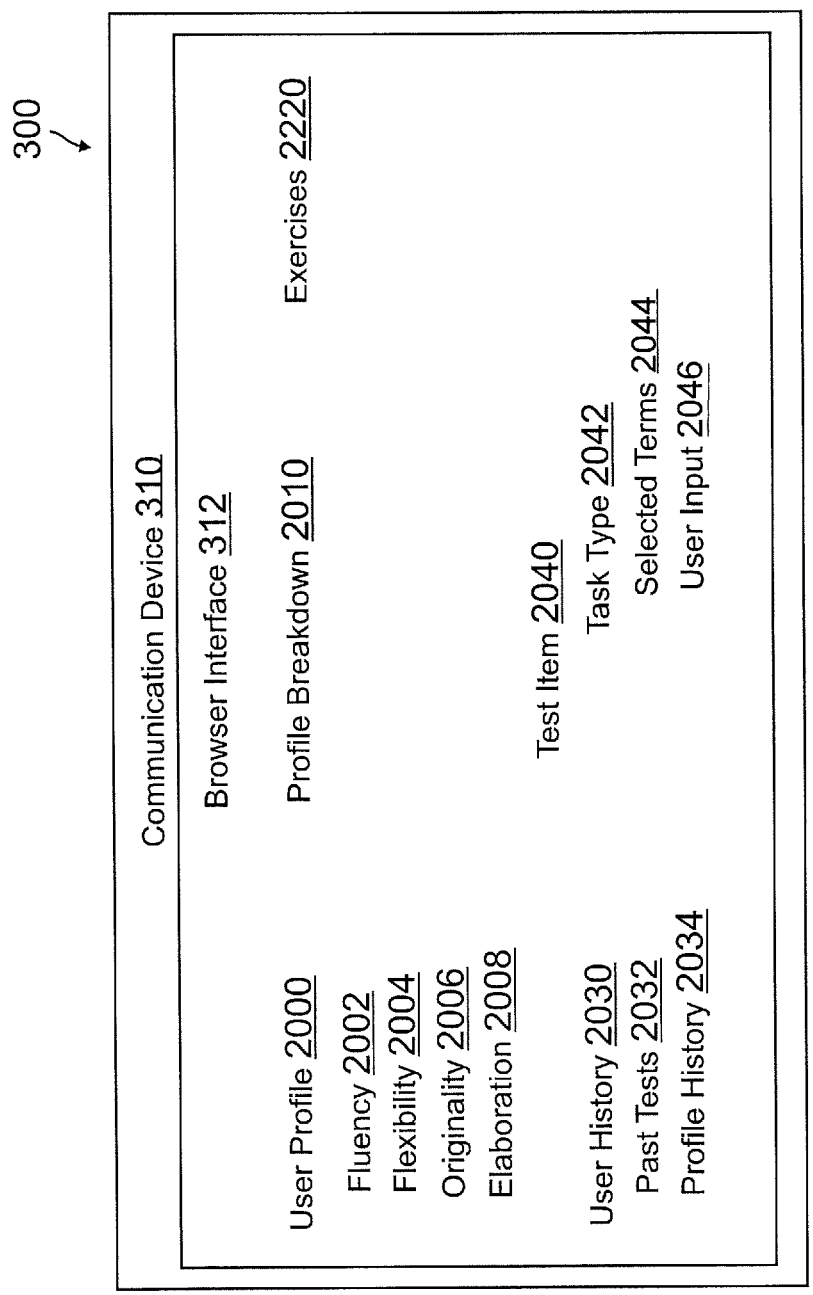
FIG. 3 is a communication device interface displaying a test item, a user profile, and a user history, according to an embodiment.

FIG. 3 is a communication device interface displaying a test item, a user profile, and a user history, according to an embodiment. Environment 300 of FIG. 3 includes a user device 310 corresponding generally to communication device 110 of FIG. 1. Communication device 310 executes a browser interface 312 corresponding generally to the specialized hardware and/or software modules and processes described in reference to browser module 112 of FIG. 1. Browser interface 312 includes a user profile 2000, a profile breakdown 2010, exercises 2220 a user history 2030 and a test item 2040. User profile 2000 may include a profile for a user utilizing a creativity assessment, and may include a current and/or past score for creativity assessment as well as a per measure of creativity score. Thus, user profile 2000 includes scores for fluency 2002, flexibility 2004, originality 2006, and elaboration 2008.

A user may view a score for each creativity measure under user profile 2000 and may select options under user profile 2000 and/or profile breakdown 2010 in order to view detailed information about the user's creativity score, creativity scores in general, what each measure of a creativity score means, and averaged creativity scores for a plurality of users, including all users taking creativity assessments. Further, the user may utilize user history 2030 in order to view past creativity scores and/or past scores for each creativity measure. Thus, the user may select one or more of past tests 2032 and/or profile history 2034 to view a breakdown of the user's past performance on creativity assessments.

In order to receive a creativity assessment, the user may complete test item 2040 having task type 2042 for selected terms 2044. Test item 2040 may be completed with user input 2046 and may be processed to determine scores in user profile 2000, as previously discussed. Moreover, if the user wishes to further test or develop their creativity without performing scored user assessments, the user may access exercises 2220. Exercises 2220 may provide similar creativity assessments to test item 2040 but may not be scored by the creativity assessment server. In other embodiments, exercises 2220 may be scored by the creativity assessment server but may not affect user profile 2000 or other creativity assessment score. In such embodiments, the score for exercises 2220 may simply be presented to the user for the user's own self-testing and progress.

Figure 4:
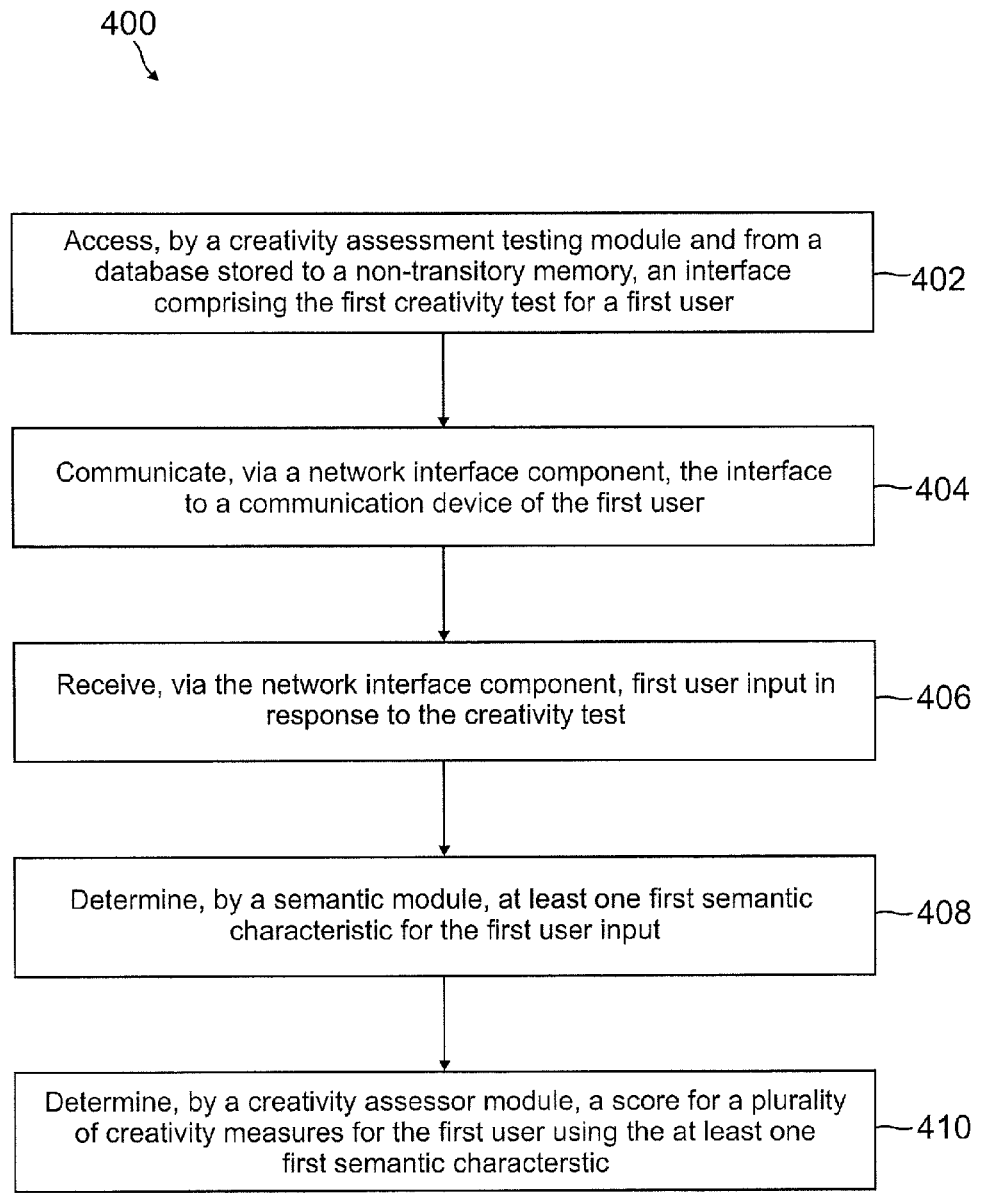
FIG. 4 is a flowchart for a semantic-based creativity assessment, according to an embodiment.

FIG. 4 is a flowchart for a semantic-based creativity assessment, according to an embodiment. Note that one or more steps, processes, and methods described herein may be omitted, performed in a different sequence, or combined as desired or appropriate, as well as be performed by different modules, entities, components, or systems.

At step 402, an interface comprising a first creativity test for a first user is accessed by a creativity assessment testing module and from a database stored to a non-transitory memory. The first creativity test may correspond to a test item. The first creativity test may be determined by a test item generator module using a task type and at least one of a plurality of terms. The test item generator module may populate the task type with the at least one of the plurality of terms, and may choose the task type and the at least one of the plurality of terms based on the complexity of the at least one of the plurality of terms. Further, the test item generator module may determine the first creativity test based on user input to a second creativity test, where the second creativity test is completed by the user prior to the test item generator module determining the first creativity test. In certain embodiments, a second user (e.g., a second test taker of the second creativity test) may provide the user input to the second creativity test. Thus, the user input used to determine the first creativity test may comprise answers and/or performances by one or more other users/test takers. The one or more other users/test takers may correspond to other users/test takers of the same system, but also may be limited to users having similar demographics, percentiles, or other user information. For example, the user input from the second user/test taker may correspond to user input for one or more users in a similar percentile bracket of a scoring system or having the same or similar demographic information (e.g., job, age, location, etc.). In other embodiments, the task type and/or the at least one of the plurality of terms may be manually provided by a different type of second user, such as an administrator of the creativity test who may not take the first or second creativity tests. In such embodiments, the administrator may specify semantic characteristics and/or scores for terms within the first creativity test.

The interface is communicated, via a network interface component, to a communication device of the first user, at step 404. At step 406, first user input in response to the creativity test may be received, via the network interface component. The first user input may comprise a text response that is submitted by the first user to the communication device using one of voice input and written input. At step 408, at least one first semantic characteristic may be determined, by a semantic evaluator module. The semantic characteristic(s) may comprise a similarity distance between terms and units of test of response to the first creativity test in the first user input. Thus, at step 410, a score for a plurality of creativity measures for the first user may be determined using the at least one of the first semantics characteristics by a creativity assessor module. The score may be adjusted based on an initial score, such as one determined from the second creativity test the first user completed prior to the present first creativity test.

The plurality of creativity measures may comprise a fluency measure, a flexibility measure, an originality measure, and an elaboration measure. Thus, the at least one first semantic characteristic may comprise a number of unique and relevant responses to the first creativity test in the first user input, where the fluency measure is associated with the number of unique and relevant responses. The at least one first semantic characteristic may also comprise a number of distinct categories of responses to the first creativity test in the first user input, where the flexibility measure is associated with the number of distinct categories. The at least one first semantic characteristic may also comprise a measure of a statistical infrequency of each response to the first creativity test in the first user input, where the originality measure is associated with the measure. The at least one first semantic characteristic may also comprise a level of detail for responses to the first creativity test in the first user input, where the elaboration measure is associated with the level of detail.

Figure 5:
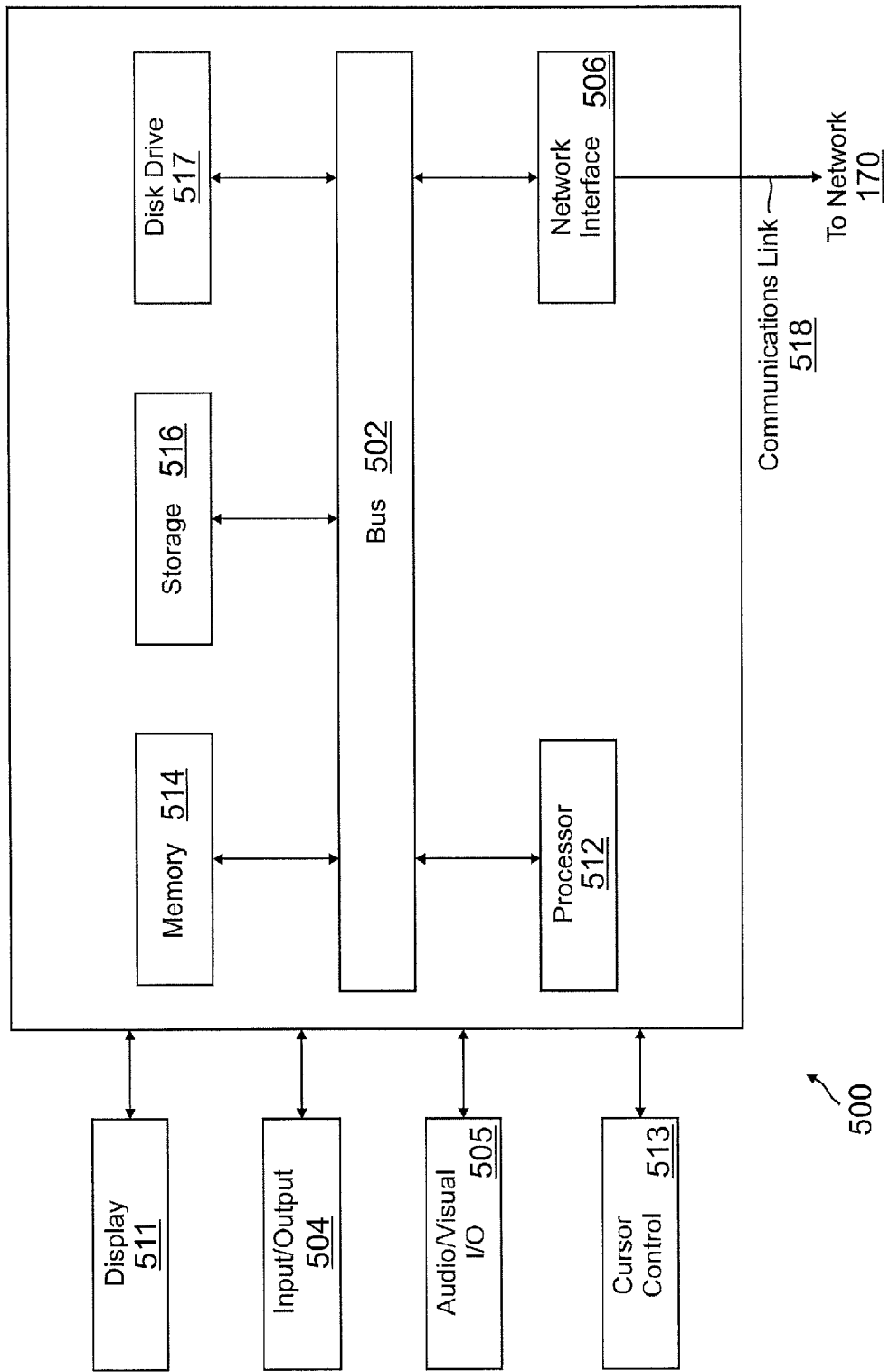
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 170. In one embodiment, the transmission is wireless, although other transmission mediums and methods may also be suitable. One or more processors 512, which can be a micro-controller, digital signal processor (DSP), or other processing component, process these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a creativity assessment testing module comprising at least one hardware processor and a network interface component that accesses a webpage interface of a website comprising a first creativity test for a first user, communicates the webpage interface to a communication device of the first user through an application executing on the communication device, and receives first user input in response to the first creativity test;
    a database, stored to a non-transitory memory, comprising the webpage interface, the first creativity test, a plurality of task types, a plurality of terms, the first user input and at least one first semantic characteristic of the first user input;
    a test item generator module that generates the first creativity test for the first user using a first one of the plurality of task types and a first at least one of the plurality of terms, wherein the first creativity test comprises an interactive electronic game executable within the application of the communication device and presentable within the website;
    a semantic evaluator module that accesses the first user input, parses the first user input using a parsing process to separate individual text from units of text in the first user input, and determines the at least one first semantic characteristic of the first user input using the individual text and the units of text from the parsing process; and
    a creativity assessor module that accesses the at least one first semantic characteristic and determines a score for a plurality of creativity measures for the first user using the at least one first semantic characteristic.

2. The system of claim 1, wherein the plurality of creativity measures comprise a fluency measure, a flexibility measure, an originality measure, and an elaboration measure.

3. The system of claim 2, wherein the at least one first semantic characteristic comprises a number of unique and relevant responses to the first creativity test in the first user input, and wherein the fluency measure is associated with the number of unique and relevant responses.

4. The system of claim 2, wherein the at least one first semantic characteristic comprises a number of distinct categories of responses to the first creativity test in the first user input, and wherein the flexibility measure is associated with the number of distinct categories.

5. The system of claim 2, wherein the at least one first semantic characteristic comprises a measure of a statistical infrequency of each response to the first creativity test in the first user input, and wherein the originality measure is associated with the measure.

6. The system of claim 2, wherein the at least one first semantic characteristic comprises a level of detail for responses to the first creativity test in the first user input, and wherein the elaboration measure is associated with the level of detail.

7. The system of claim 1, wherein the first at least one of the plurality of terms for the first one of the plurality of task types is manually provided by an administrator of the first creativity test.

8. The system of claim 1, wherein the first user input comprises a text response that is submitted by the first user to the communication device using one of voice input and written input.

9. The system of claim 1, wherein the test item generator module further determines the first creativity test based on a second user input to a second creativity test received by the creativity assessment testing module prior to the test item generator module determining the first creativity test.

10. The system of claim 9, wherein the semantic evaluator module accesses the second user input and determines at least one second semantic characteristic for the second user input, and wherein the creativity assessor module accesses the at least one second semantic characteristic and determines an initial score for the plurality of creativity measures for the first user using the at least one second semantic characteristic.

11. The system of claim 10, wherein the creativity assessor module adjusts the initial score for the plurality of creativity measures using the score for the plurality of creativity measures.

12. The system of claim 1, wherein the at least one first semantic characteristic comprises a similarity distance between terms and units of text in response to the first creativity test in the first user input.

13. The system of claim 1, wherein the first at least one of the plurality of terms populate the first one of the plurality of task types in order to determine the first creativity test.

14. The system of claim 1, wherein the test item generator module uses the first at least one of the plurality of terms for the first creativity test based on a complexity of the first at least one of the plurality of terms.

15. A method comprising:
generating, by a test item generator module comprising at least one hardware processor, a first creativity test for a first user using a task type and at least one of a plurality of terms, wherein the first creativity test comprises an interactive electronic game executable within an application of a communication device of a first user and presentable within a website;
accessing, by a creativity assessment testing module and from a database stored to a non-transitory memory, a webpage interface of the website comprising the first creativity test for the first user;
communicating, via a network interface component, the webpage interface to the communication device of the first user through the application executing on the communication device;
receiving, via the network interface component, first user input in response to the first creativity test;
parsing the first user input using a parsing process to separate individual text from units of text in the first user input;
determining, by a semantic evaluator module, at least one first semantic characteristic for the first user input using the individual text and the units of text from the parsing process; and
determining, by a creativity assessor module, a score for a plurality of creativity measures for the first user using the at least one first semantic characteristic.

16. The method of claim 15, wherein the plurality of creativity measures comprise a fluency measure, a flexibility measure, an originality measure, and an elaboration measure.

17. The method of claim 15, wherein the determining the first creativity test is based on a second user input to a second creativity test received by the creativity assessment testing module prior to the determining the first creativity test.

18. The method of claim 17, wherein prior to the determining the first creativity test, the method further comprising:
accessing the second user input;
determining at least one second semantic characteristic for the second user input; and
determining an initial score for the plurality of creativity measures for the first user using the at least one second semantic characteristic.

19. The method of claim 14, wherein the determining the score comprises adjusting the initial score for the plurality of creativity measures using the score for the plurality of creativity measures.

20. A non-transitory computer-readable medium comprising executable modules which, in response to execution by a computer system, cause the computer system to perform a method comprising:
generating, by a test item generator module comprising at least one hardware processor, a first creativity test for a first user using a task type and at least one of a plurality of terms, wherein the first creativity test comprises an interactive electronic game executable within an application of a communication device of a first user and presentable within a website;
accessing, by a creativity assessment testing module and from a database stored to a non-transitory memory, a webpage interface of the website comprising the first creativity test for the first user;
communicating, via a network interface component, the webpage interface to the communication device of the first user through the application executing on the communication device;
receiving, via the network interface component, first user input in response to the first creativity test;
parsing the first user input using a parsing process to separate individual text from units of text in the first user input;
determining, by a semantic evaluator module, at least one first semantic characteristic for the first user input using the individual text and the units of text from the parsing process; and
determining, by a creativity assessor module, a score for a plurality of creativity measures for the first user using the at least one first semantic characteristic.

* * * * *